United States Patent [19]

Nakai

[11] Patent Number: 6,028,705
[45] Date of Patent: Feb. 22, 2000

[54] IMAGE READING APPARATUS WITH REFLECTION TYPE BLAZED DIFFRACTION GRATING FOR COLOR SEPARATION

[75] Inventor: Takehiko Nakai, Tokyo, Japan

[73] Assignee: Canon Kabushiki Kaisha, Tokyo, Japan

[21] Appl. No.: 08/249,475

[22] Filed: May 26, 1994

Related U.S. Application Data

[63] Continuation of application No. 07/942,212, Sep. 9, 1992, abandoned.

[30] Foreign Application Priority Data

Sep. 18, 1991 [JP] Japan ..................................... 3-267081

[51] Int. Cl.[7] ................................ G02B 5/18; H01L 27/00
[52] U.S. Cl. .......................... 359/570; 359/569; 359/571; 250/208.1
[58] Field of Search .................................... 359/566, 569, 359/571; 250/208.1

[56] References Cited

U.S. PATENT DOCUMENTS

| | | | |
|---|---|---|---|
| 3,680,945 | 8/1972 | Sheridon .................................. | 359/571 |
| 4,277,138 | 7/1981 | Daummann . | |
| 4,330,175 | 5/1982 | Fujii et al. ............................... | 359/571 |
| 4,405,405 | 9/1983 | Fujii et al. ............................... | 359/570 |
| 5,113,067 | 5/1992 | Nakai et al. . | |
| 5,162,943 | 11/1992 | Komatsu et al. ........................ | 359/574 |
| 5,173,599 | 12/1992 | Setani ..................................... | 359/571 |

FOREIGN PATENT DOCUMENTS

| | | |
|---|---|---|
| 0383308 | 8/1990 | European Pat. Off. . |
| 0440169 | 8/1991 | European Pat. Off. . |
| 63-120230 | 5/1988 | Japan . |
| 3-017847 | 1/1991 | Japan . |

OTHER PUBLICATIONS

Patent Abstracts of Japan, vol. 12, No. 368 (P–766) Oct. 4, 1988.

Patent Abstracts of Japan, vol. 15, No. 140 (P–1188) Apr. 9, 1991.

*Primary Examiner*—Cassandra Spyrou
*Assistant Examiner*—Audrey Chang
*Attorney, Agent, or Firm*—Fitzpatrick, Cella, Harper & Scinto

[57] ABSTRACT

A color image reading apparatus is provided wherein a color picture image is read out by a monolithic three line sensor through a reflection type one-dimensional blazed diffraction grating acting as a color separating means. The diffraction grating is concavely curved forward the line sensor, and a light beam, diverging after being focused by an image forming optical element having a predetermined refracting power only in a sub-scan cross section, is color-separated into three color light components by the diffraction grating and re-imaged on the surface of the three line sensors located at a predetermined position. As a result, the blur of ±1 order diffracted lights in a sub-scanning direction can be prevented which is due to the deviation of a reflective diffraction angle resulting from the difference in an incident angle of respective lights on the grating surface in the sub-scan cross section. At this time, a convergent spherical wave that is a light beam emerging from the image forming optical system enters the diffraction grating.

33 Claims, 6 Drawing Sheets

SUB-SCAN CROSS SECTION

SUB-SCAN CROSS SECTION

IMAGE READING APPARATUS WITH REFLECTION TYPE BLAZED DIFFRACTION GRATING FOR COLOR SEPARATION

This application is a continuation of application Ser. No. 07/942,212 filed Sep. 9, 1992, which is now abandoned.

BACKGROUND OF THE INVENTION

1. Field of the Invention

The present invention relates to an image reading apparatus, and particularly to an image or color picture image reading apparatus wherein there are provided an image-forming optical element or device having different refracting powers with respect to a main scanning direction and a sub-scanning directions, a color separating means comprised of a reflection type one-dimensional blazed diffraction grating having a predetermined shape and a light receiving means of a predetermined shape in which three line sensors or sensor arrays (light receiving elements) are arranged on a common substrate. The light receiving elements are arranged for preventing the occurrence of blurring of images of respective color light components formed on the sensor arrays due to the deviation of a reflective diffraction angle resulting from the difference in an incident angle on the blazed diffraction grating and hence color picture image information on an object or an original surface can be read with high precision. The image reading apparatus of the present invention can preferably be used in, for example, a color scanner and a color facsimile.

2. Related Background Art

Conventionally, there have been proposed various kinds of apparatuses for forming the images of a color picture image information on an object on respective line sensor (CCD) surfaces through an optical system and digitally reading the color picture image information by using an output signal from the line sensor.

FIG. 1 schematically shows the main part of an optimal system of a prior art color image reading apparatus. In FIG. 1, a light beam from a color picture image on an object surface 11 is condensed by an image-forming lens 19 to be imaged on line sensor surfaces (described below). In this structure, the light beam is color-separated into three light color components such as red (R), green (G) and blue (B) by a three-piece (3P) prism 20 and thereafter the separated color components are directed onto the respective line sensors 21, 22 and 23. A line scanning in an auxiliary scanning direction is performed for the color picture images formed on the respective line sensors 21, 22 and 23 to achieve an image reading of the respective color light components.

FIG. 2 schematically shows the main part of an optical system of another prior art color image reading apparatus. In FIG. 2, a light beam from a color picture image on an object surface 11 is condensed by an image-forming lens 29 to be imaged on line sensor surfaces explained below). In this structure, the light beam is color-separated into three light beams corresponding to three light color components by two color-separating beam splitters 30 and 31 which respectively have wavelength-selective dichroic transmission films. The color picture images corresponding to three color light components are respectively formed on a so-called monolithic three-line sensor 32 having three line sensors arranged on a common substrate. Line scanning in a sub-scanning direction is performed for the color picture images to achieve an image reading of the respective color light components.

FIG. 3($a$) shows the monolithic three-line sensor 32 illustrated in FIG. 2 and FIG. 3($b$) is an enlarged view of section 28 of line sensor 25. In the monolithic three-line sensor 32, three line sensors (CCD) 25, 26 and 27 are arranged in parallel equal distances apart from one another on a common substrate, and color filters (not shown) corresponding to the respective color light components are provided on the respective line sensor surfaces Distances $S_1$ and $S_2$ of the line sensors 25, 26 and 27 are generally set to, for example, approx. 0.1–0.2 mm, and pixel widths $W_1$ and $W_2$ of each single element of line sensors 25, 26 and 27 are set to, for example, approx. 7 $\mu$m×7 $\mu$m and 10 $\mu$m×10 $\mu$m, under various manufacturing conditions.

The color picture image reading apparatus shown in FIG. 1, however, requires three independent line sensors 21, 22 and 23 and a highly precise structure, as well as the 3P prism 20 which is difficult to manufacture. Hence, the entire apparatus becomes complicated and expensive. Furthermore, the alignment adjustment between the image-forming light beam and each line sensor should be conducted independently for the respective line sensors 21, 22 and 23, and hence, the assembly adjustment is cumbersome.

Further, in the color picture image reading apparatus shown in FIG. 2, the distance between the lines of the line sensors becomes $2\sqrt{2}X$ when the plate thickness of the beam splitters 30 and 31 is set to a value of X.

Assuming the distances between the lines of the line sensors that are preferable in their manufacture are equal to approx. 0.1–0.2 mm, the plate thickness X of the beam splitters 30 and 31 becomes approx. 35–70 m.

Generally, it is considerably difficult to structure a beam splitter having such a thin thickness while maintaining an optimum optical flatness. As a result, degradation of the optical performance of the color picture image formed on the line sensor occurs when the beam splitter having such a thickness is used.

On the other hand, as shown in FIGS. 4($a$) and 4($b$), the distances $S_1$ and $S_2$ from the center line 26 of the monolithic three line sensor to the other two lines 25 and 27, respectively, are generally equal to each other in opposite directions, and this distance is set to an integer multiple of the pixel size $W_2$ (see FIG. 3) in the sub-scanning direction. The reason therefor is as follows:

When the read-out of the color picture image is performed by the above-described monolithic three line sensor using only an ordinary image-forming optical system 43, as shown in FIG. 4, read-out positions on the object surface 11 which can simultaneously be read by the three line sensors 25, 26 and 27 are three different positions 25', 26' and 27' as shown in FIG. 4.

Therefore, respective signal components of three colors (R, G, B) for any one position on the object surface 11 cannot be read simultaneously, and instead, after the respective read-outs by the three line sensors, the read-out color component signals for the same position on the object surface 11 must be combined.

For this purpose, the distances $S_1$ and $S_2$ between the lines of the three line sensor are set to an integer multiple of the pixel size $W_2$, and corresponding thereto, a redundant line memory is provided. In this structure, the combined signal of the three color signal components for the same position on the object can be readily obtained by, for example, delaying the G and R signals (signal components corresponding to the G and R color light components) relative to the B signal (a signal component corresponding to the B color light component).

Thus, the distances $S_1$ and $S_2$ from the center line 26 of the monolithic three line sensor to the other two lines 25 and 27 are set to integral multiples of the pixel size $W_2$ in the sub-scanning direction.

In the above-discussed color picture image reading apparatus, however, the redundant line memory should be fully arranged between the lines of the three line sensor, and hence a plurality of expensive line memories should be provided. As a result, the apparatus has a high manufacturing cost and the structure of the apparatus becomes complicated.

Further, a color picture image reading apparatus is known in which a blazed diffraction grating is employed instead of a dichroic mirror (see U.S. Pat. No. 4,277,138 issued to Hans Dammann on Jul. 7, 1981). In this structure, there is provided an optical system in which a blazed diffraction grating is used as a color separating means.

This structure, however, is subject to the blur of images of respective color light components due to the deviation of a reflective diffraction angle resulting from the difference in an incident angle on the blazed diffraction grating.

SUMMARY OF THE INVENTION

It is an object of the present invention to provide an image reading apparatus in which a one dimensional blazed diffraction grating having a specific shape is used.

It is a further object of the present invention to provide an image reading apparatus in which a color image is read using a color separating means comprised of a reflection type one-dimensional blazed diffraction grating, the shape of the diffraction grating is concavely curved for a light receiving means (a three-line sensor) in a sub-scan cross section so that the blur of ±1 order diffracted lights on the light receiving element surface in a grating pitch section direction (a sub-scanning direction) due to the deviation of a reflection diffraction angle at respective reflection points resulting from the difference in an incident angle on the diffraction grating can be prevented and hence the color picture image on an object can digitally be read with high precision through, for example, three color light components of R, G, and B.

According to one aspect of the image reading apparatus of the present invention, a color picture image is image-formed by an image-forming optical system on a plurality of line sensors arranged on a common substrate. There are provided an image-forming optical element having different refracting powers in a sub-scan cross section and in a main-scan cross section and disposed in an optical path at the rear of the image-forming optical system, and a color separating means comprised of a reflection type one-dimensional blazed diffraction grating for separating into three color components in the sub-scanning direction a light beam from the color image diverging after once focused by the image-forming optical element and disposed in an optical path between the image-forming optical system and the light receiving means surface, for reading the color image by the light receiving means. The shape of the diffraction grating is concavely curved toward the light receiving means in the sub-scan cross section.

These advantages and others will be more readily understood in connection with the following detailed description of the preferred embodiments in conjunction with the drawings.

DESCRIPTION OF THE PREFERRED EMBODIMENT

Figure 5A:
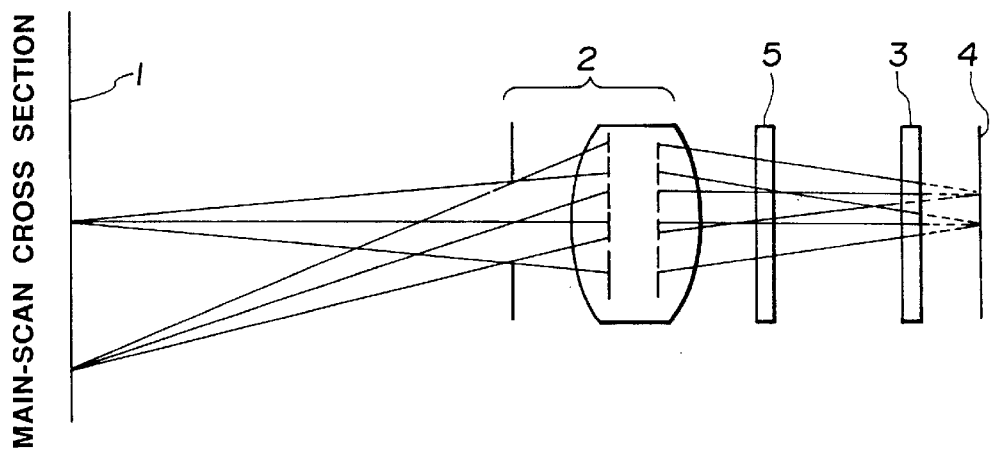
FIGS. 5A and 5B are respectively plan and side views illustrating the structure of a main part of a first embodiment according to the present invention.

A first embodiment of an image reading apparatus according to the present invention will be explained referring to FIGS. 5A and 5B which are respectively a plan view (a section taken along a main scanning direction or a main-scan cross section) and a side view (a section taken along a sub-scanning direction or a sub-scan cross section) of a main part.

Figure 5B:
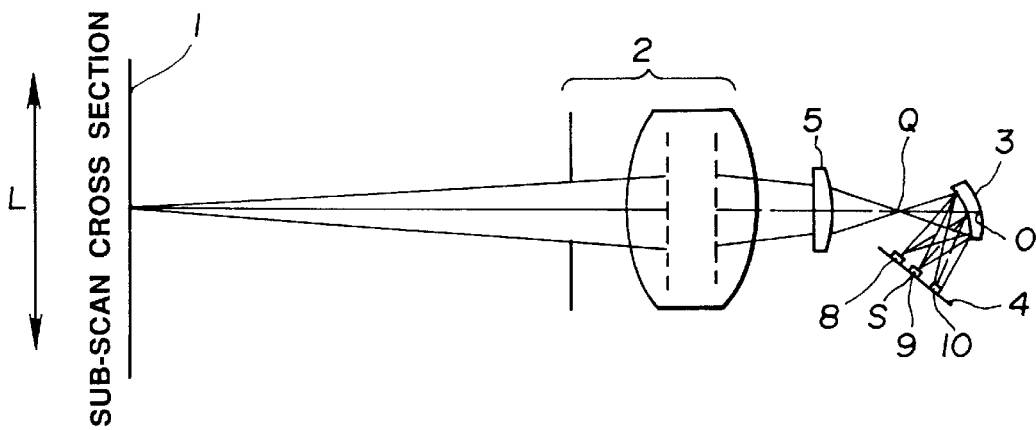
Figure 6:
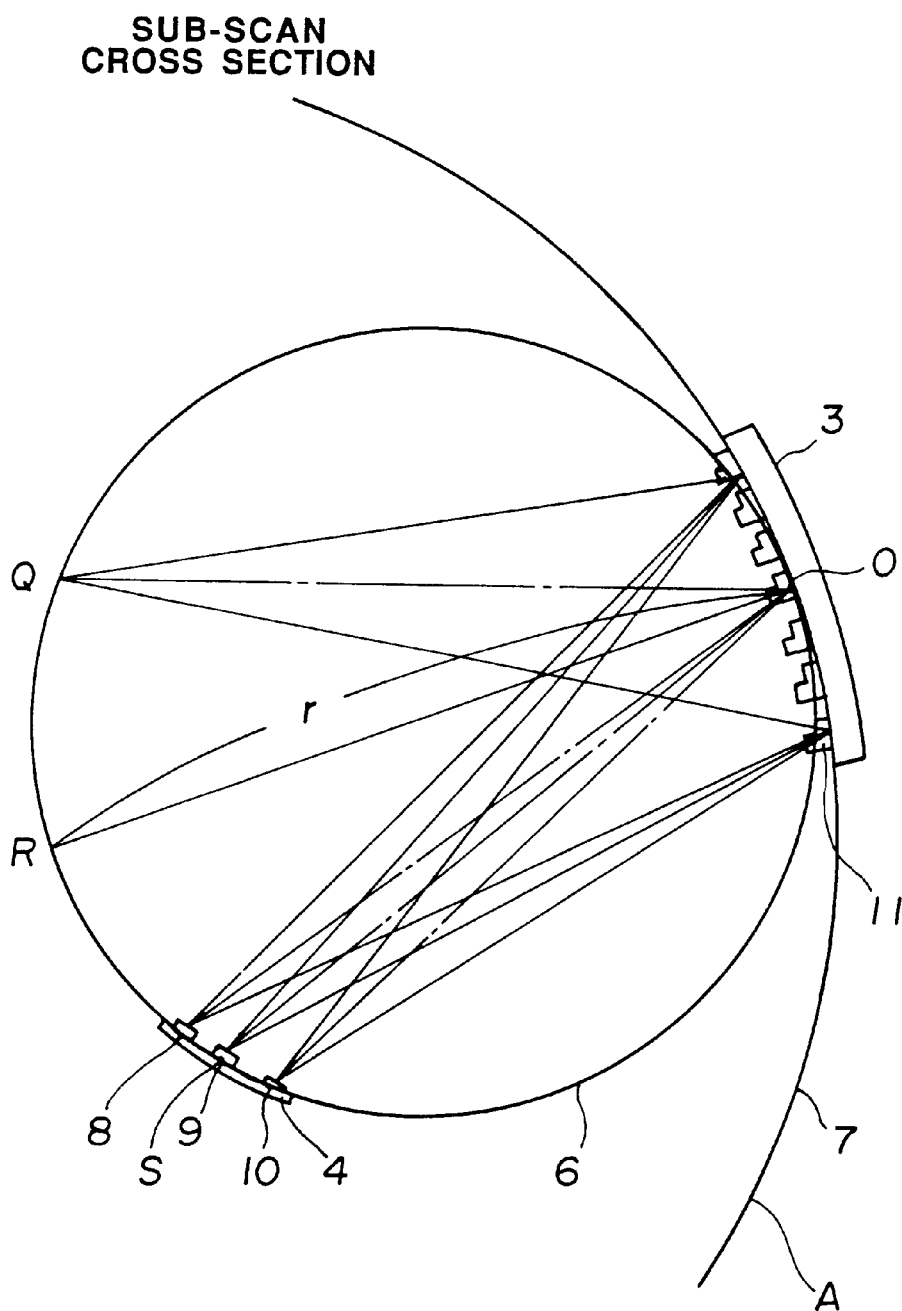
FIG. 6 is an enlarged view showing a part of FIG. 5B.

FIG. 6 is an enlarged view of a part shown in FIG. 5B, and shows a light beam of a color picture image diverging after once focused in the sub-scan cross section is color-separated into three color light components and re-imaged on the surface of a light receiving means by a reflection type one-dimensional blazed diffraction grating. In FIGS. 5A and 5B, reference numeral 1 is an object surface on which a color picture image is formed and which is illuminated by an illumination light source (not shown) for reading information thereon. Reference numeral 2 is an image forming optical system serving as an optical image forming means for image-forming the light beam of the color picture image on the surface of the light receiving means (a monolithic three-line sensor) through the reflection type one-dimensional blazed diffraction grating described below. Reference numeral 5 is an image forming optical element for image-forming the light beam of the color picture image on a given point Q on a Rowland circle 6 described below in the sub-scan cross section. The image forming optical element 5 consists of a cylindrical lens having a predetermined refracting power solely in the sub-scan cross section.

Further, reference numeral 3 is a color separating means comprised of a reflection type one-dimensional blazed diffraction grating (also referred to simply as a diffraction grating hereinbelow) for separating an incident light into predetermined color light components, for example, three primary colors R(red), G(green) and B(blue) and reflection-diffracting the color light components in a direction of the arrangement of the line sensor pixels (the main scanning direction) and a direction perpendicular thereto (the sub-scanning direction).

In the first embodiment, the diffraction grating 3 has a shape which is concavely curved toward the light receiving means (a three-line sensor) 4 described below in sub-scan cross section. That is, the diffraction grating 3 is curved in the sub-scan cross section with a curvature of part of a circle.

Further, reference numeral 4 is the light receiving means composed of a so-called monolithic three line sensor in which three line sensors or sensor arrays (CCD) 8, 9 and 10 are arranged in parallel on a common substrate. In the first embodiment, the light receiving means (the three line sensor) 4 is curved concavely for the diffraction grating 3 and in which the respective line sensors 8, and 9 and 10 are positioned on a circle of the Rowland circle 6 described below.

The distances between the line sensors 8, 9 and 10 are respectively set to different values corresponding to color separation directions of the color light components of the color separating means 3.

In the first embodiment, the color image on the object surface 1 is line-scanned in the sub-scanning direction (a direction of L in FIG. 5B) by a scanning means including a mirror (not shown) interposed between the object surface 1 and the image-forming optical system 2 and so forth. The light beam from the color picture image is condensed by the image-forming optical system 2 and is initially focused in the sub-scan cross section by the cylindrical lens 5, following which the light beam diverges. After the light beam from the color picture image is separated into three color light components by the one-dimensional blazed diffraction grating 3, the respective color light components are focused on the surfaces of the corresponding line sensors 8, 9 and 10. The color picture images of the respective color light components are digitally read by the light receiving means 4.

In order to clarify the advantage of the present invention, the problem occurring when a reflection type one-dimensional blazed diffraction grating having an ordinary plain shape is used will be described referring to FIGS. 7A and 7B.

Figure 7A:
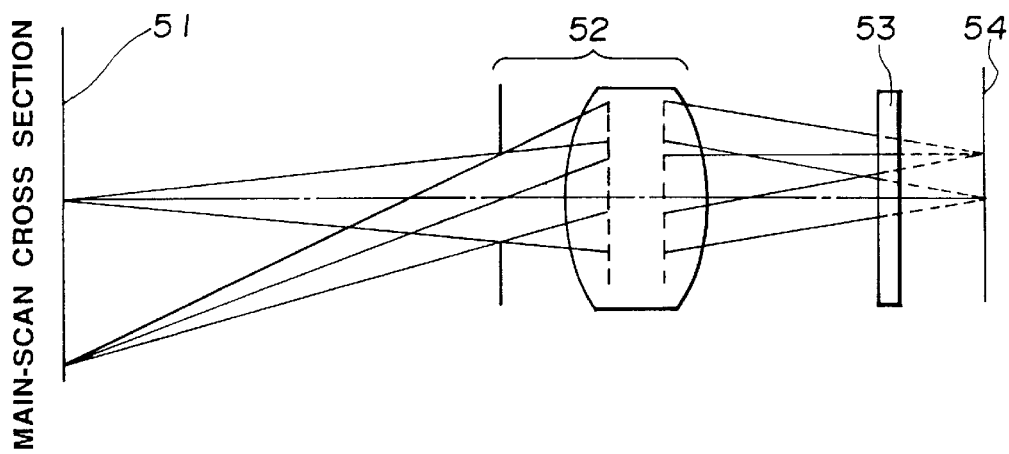
FIGS. 7A and 7B are respectively plan and side views illustrating the structure of a main part of a color picture image reading apparatus.
Figure 7B:
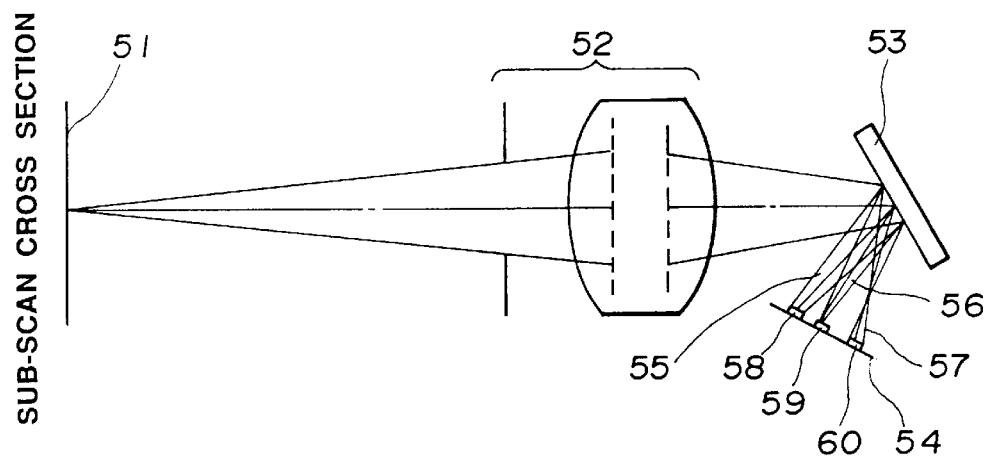

FIGS. 7A and 7B respectively show main-scan cross section and sub-scan cross section of a color picture image reading apparatus.

In FIGS. 7A and 7B, a reflection type one dimensional blazed diffraction grating 53 for color separation separates a light beam reflection-diffracted by this diffraction grating 53 into −1 order light 55, 0 order light 56, and +1 order light 57 in respective directions. These diffracted light beams are image-formed on the surfaces of respective line sensors 58, 59 and 60 as converging spherical waves by an image-forming optical system 52.

With respect to such converging spherical waves, incident angles relative to the one dimensional blazed diffraction grating 53 are different among a light beam incident on the diffraction grating 53 from above with respect to the optical axis, a light beam incident on the diffraction grating 53 along the optical axis and a light beam incident on the diffraction grating 53 from below with respect to the optical axis.

In the first order diffraction of the reflection diffraction, the following relation exists between a reflection diffraction angle θ' and an incident angle θ:

$$\sin \theta' - \sin \theta = \pm \lambda/P,$$

where λ is a wavelength, a positive sign represents +1 order, a negative sign represents −1 order and P is a grating pitch.

From the above relation, the reflective diffraction angle θ' can be obtained from the following formula:

$$\theta' = \sin^{-1} (\pm \lambda/P + \sin \theta) \qquad (1).$$

The reflection diffraction angles θ' of the color light components are different from one another in the sub-scan cross section. Therefore, when the one dimensional blazed diffraction grating 53 is disposed in the converging spherical wave from an object 51 through the image-forming optical system 52, the blurs corresponding to the deviations of the reflective diffraction angles θ' of the diffracted light beams of respective order (±1 order lights) appear on the image-formed surface (the surface of the light receiving element).

In the first embodiment, therefore, the shape of the diffraction grating 3 is concavely curved with respect to the light receiving means (the three-line sensors 4, the shape of the light receiving means 4 is concavely curved with respect to the diffraction grating 3 and they are disposed properly so that the generation of blurs of the ±1 order diffracted lights on the light receiving element surfaces is effectively prevented.

Optical arrangement and operation of the main part of the first embodiment will be described. In FIG. 6 (the sub-scan cross section), it is assumed that a light beam of the color picture image emerging from the image-forming optical system 2 is initially focused by the cylindrical lens 5 at a point Q. The light beam diverging from the point Q is reflection-diffracted by the diffraction grating 3 and separated into three color light components, and the respective color light components are image-formed by the diffraction grating 3 on the surface of the three line sensor 4, which is the same image-formed surface as that of the light beam in the main scan cross section. Here, a point at a center position on a curved surface 7 of the diffraction grating 3 is designated by a point 0, and a point on a line from the point 0 and perpendicular to a tangent of the curved surface 7 by the length of a radius of curvature r of a sphere A of the curved surface 7 is designated by a point R.

In FIG. 6, a circle 6 whose diameter is a distance R0 from the point 0 to the point R is depicted. In the sub-scan cross section, when the focused point Q formed by the cylindrical lens 5 exists on the circle 6, the light beam reflection-diffracted by the diffraction grating 3 is image-formed on a given point S on this circle 6.

This circle 6 is generally called a Rowland circle (a circle whose diameter is a radius of curvature r of the sphere A), and it is known that the color-separated color light components diffracted by the diffraction grating 3 are focused without blur on the surface of the three line sensor 4 when, for example, the surface of the three line sensor 4 acting as a light receiving surface is positioned on the Rowland circle 6.

In the first embodiment, the light beam of the color picture image is focused on the given position Q on the Rowland circle 6 by the cylindrical lens 5, and the light receiving means 4 is concavely curved for the diffraction grating 3 so that the surfaces of the line sensors 8, 9 and 10 of the light receiving means 4 are located on the the Rowland circle 6.

As a result, the respective color light components diverging from the focused position Q and color-separated by the diffracting function of the diffraction grating 3 are image-formed on the corresponding line sensors 8, 9 and 10 without any deviation. Thus, the blur on the light receiving means 4 resulting from the difference in the incident angle on the diffraction grating 3 caused in the prior art by diffraction gratings having a plain shape can effectively be eliminated.

Figure 8:
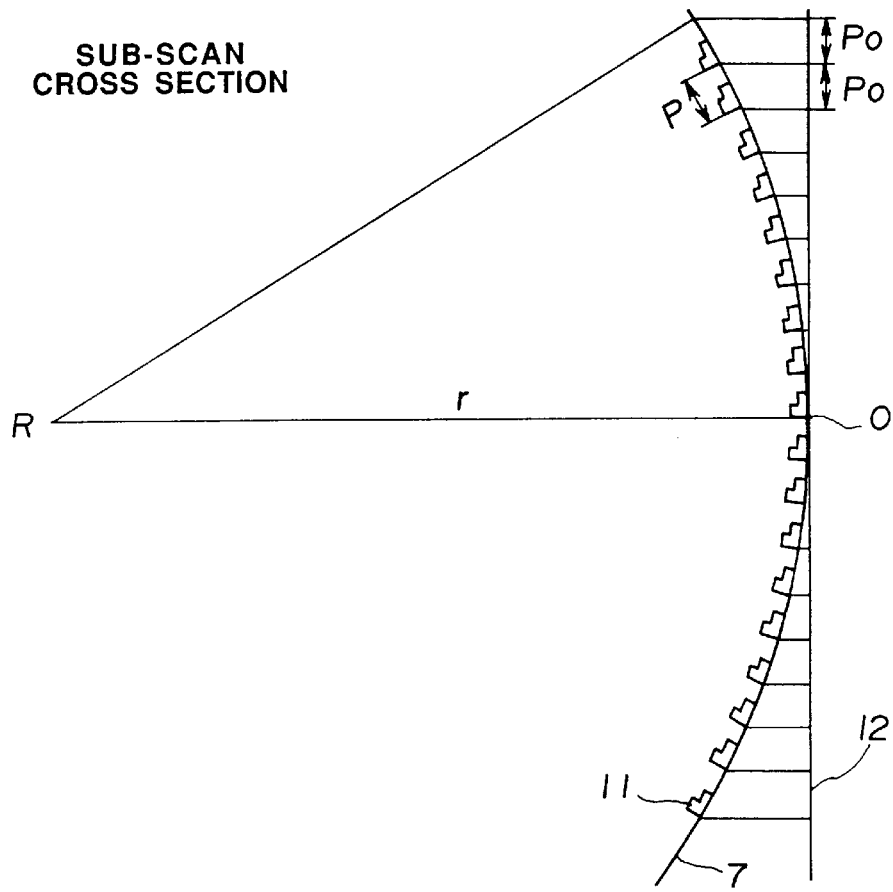
FIG. 8 is a view showing a diffraction grating shown in FIG. 5B.

FIG. 8 illustrates the diffraction grating 3 of the first embodiment. The diffraction grating 3 is curved with a curvature of part of the above-described circle, and respective gratings 11 are arranged on the curved surface 7.

The grating pitch P of the diffraction grating 3 is set so that a pitch $P_0$ formed by the projection of the grating pitch P onto a virtual plane 12 is constant when the virtual plane (a tangent plane) 12 tangent to the curved surface 7 at the center point 0 is considered. The color light components formed by the reflective diffraction and the color separation by the diffraction grating 3 are image-formed without deviation on the surfaces of the line sensors 8, 9, and 10 located on the Rowland circle 6.

In the first embodiment, the amount of curvature of the light receiving means (the three line sensor) 4 is set as follows:

$$r_1 = (\tfrac{1}{2}) \cdot R_1$$

where $r_1$ is a radius of curvature of the curved light receiving means 4 and $R_1$ is a radius of curvature of the curved diffraction grating 3. Namely, the light receiving means 4 is located on the Rowland circle 6.

Thus, in the first embodiment, the cylindrical lens 5 having a predetermined refracting power in the sub-scan cross section is disposed at the rear of the image-forming optical system 2, and the shapes and arranged locations of the gratings 11 of diffraction grating 3 acting as a color separating means and the three line sensor 4 acting as a light receiving means are properly set so that the blurs of the respective order diffracted lights (±1 order lights) on the light receiving means 4 with respect to the sub-scanning direction which is due to the deviation of the diffraction angle resulting from the difference in the incident angle on the diffraction grating 3 can effectively be prevented. The color picture image is thus read highly accurately through, for example, three color light components of R, G, and B.

Though the shape of the light receiving means 4 is curved so that the respective line sensors 8, 9 and 10 of the light receiving means 4 are located on the Rowland circle 6, the light receiving means 4 may be disposed on a plane tangent to the Rowland circle 6 in a case, for example, where the distance between the light receiving means 4 and the diffraction grating 3 can be made relatively long. In this case, any considerable blur would not be generated for the respective order color light components on the light receiving elements even if the light receiving means 4 is not curved, and hence the color picture image can be read satisfactorily. This structure is advantageous in that the shape of the light receiving means (the three line sensor) 4 does not need to be curved and the manufacturing step can be simplified.

Figure 1:
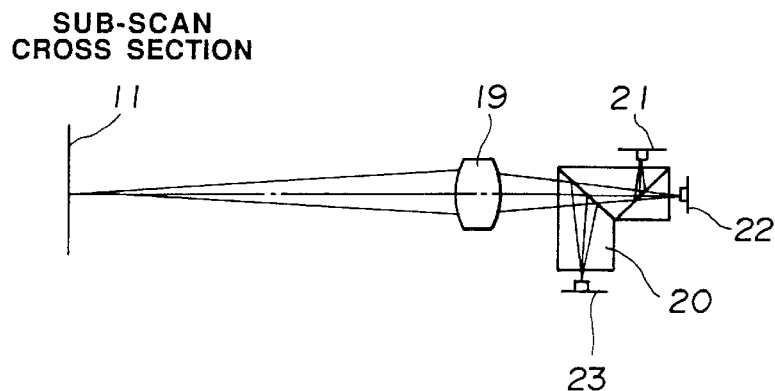
FIG. 1 is a schematic view showing the structure of a main part of an optical system of a prior art color picture image reading apparatus.
Figure 2:
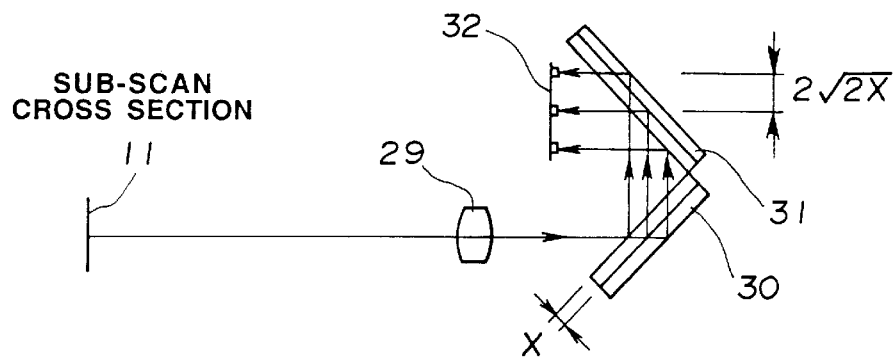
FIG. 2 is a schematic view showing the structure of a main part of an optical system of another prior art color picture image reading apparatus.
Figure 3A:
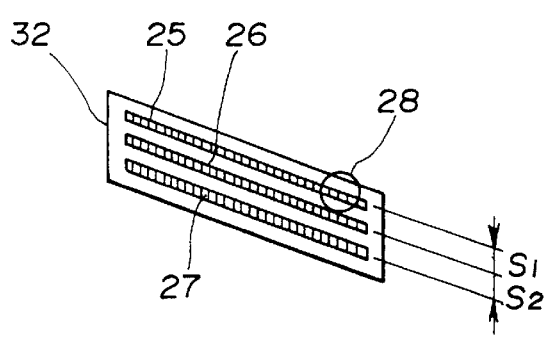
FIG. 3(a) is a view showing the structure of a monolithic three-line sensor.
Figure 3B:
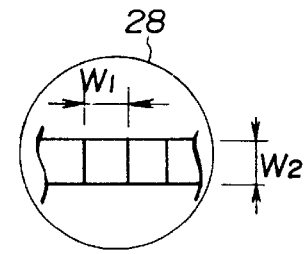
FIG. 3(b) is an enlarged view of a portion of one sensor line.
Figures 4A, 4B:
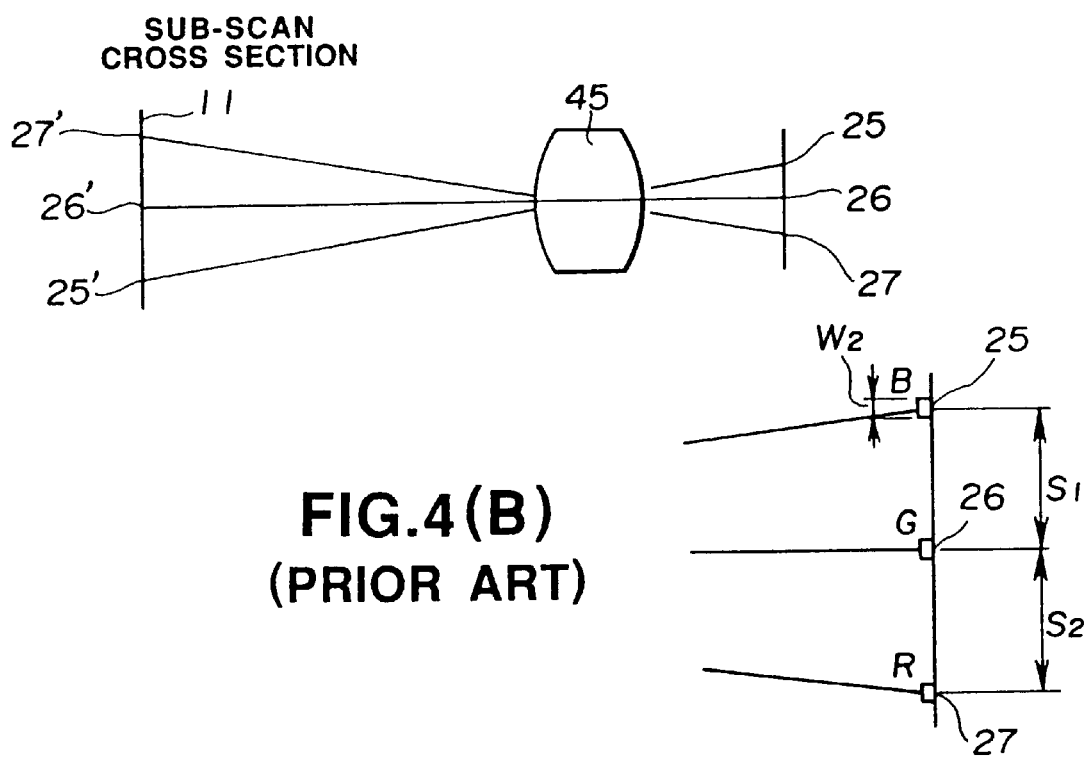
FIGS. 4(a) and 4(b) are schematic views showing the structure of a main part of an optical system of another prior art color picture image reading apparatus.
Figure 9:
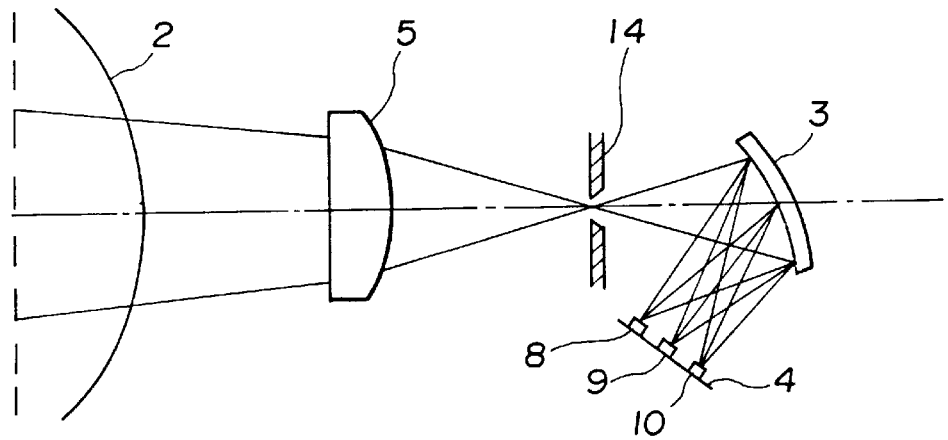
FIG. 9 is a side view illustrating the structure of a main part of a second embodiment according to the present invention.

FIG. 9 shows the sub-scan cross section of the second embodiment of the present invention. In FIG. 9, the same elements as those of FIG. 1 are designated by the same reference numerals as those in FIG. 1.

The second embodiment is different from the first embodiment in that a slit member 14 having a minute opening for controlling the passage of a light beam (i.e., an amount of light) is arranged near or proximate a focal plane position of the light beam from the color picture image focused by the cylindrical lens 5 in the sub-scan cross section. For the rest, these embodiments are the same.

In the second embodiment, the slit member 14 having the minute opening is positioned so that an off-axis light in the sub-scan cross section is prevented from entering the surface of the three line sensor 4 acting as a light receiving means. Thus, a further highly precise or accurate reading of the color picture image information can be achieved.

Although the slit member is used as a member for controlling the light beam (the amount of light) in the second embodiment, any optical member that only controls the passage of the light beam can be employed in the present invention.

In the above-discussed embodiments, the image forming optical element having a refracting power only in the sub-scan cross section is disposed at the rear of the image forming optical system. The location of the image forming optical element, however, may be any position only if the image forming optical element is disposed in an optical path from the color picture image to the color separation means.

Further, the image forming optical element is not limited to a cylindrical lens, and a toric lens may be used which has different refracting powers in the main scanning direction (the main scan cross section) and the sub-scanning direction (the sub-scan cross section).

According to the present invention, when a color picture image is read out by a light receiving means comprised of a monolithic three line sensor through a reflection type one dimensional blazed diffraction grating acting as a color separating means, the shape of the diffraction grating is concavely curved for the light receiving means and a light beam diverging after once focused by an image forming optical element having a predetermined refracting power only in the sub-scan cross section is color-separated into three color light components by the diffraction grating and re-imaged on the surface of the light receiving means located at a predetermined position. As a result, the blur of ±1 order diffracted lights in the sub-scanning direction can be prevented which is due to the deviation of a reflective diffraction angle resulting from the difference in an incident angle of respective lights on the grating surface in the sub-scan cross section. At this time, a convergent spherical wave that is a light beam emerging from the image forming optical system enters the diffraction grating. Consequently, a color image reading apparatus which can highly accurately read a color image can be achieved.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An image reading apparatus comprising:
    a multi-line sensor, said multi-line sensor comprising a common substrate and a plurality of sensor arrays arranged on said common substrate;
    an image-forming optical system for forming an image of an object on said multi-line sensor; and
    a reflection type blazed diffraction grating for separating a light beam from the object into a plurality of color light components, said diffraction grating being disposed in an optical path between said image-forming optical system and said multi-line sensor and said diffraction grating being concavely curved toward said multi-line sensor in a sub-scan cross section.

2. An image reading apparatus according to claim 1, further comprising an image-forming optical element having different refracting powers in a main scan cross section than in the auxiliary scan section, said image-forming optical element being disposed in an optical path between the object and said diffraction grating.

3. An image reading apparatus according to claim 2, wherein said image-forming optical element is disposed in an optical path between said image-forming optical system and said diffraction grating.

4. An image reading apparatus according to claim 2, wherein said image-forming optical element has refracting power solely in the sub-scan cross section.

5. An image reading apparatus according to claim 1, wherein said diffraction grating is curved in the sub-scan cross section with a curvature of part of a circle.

6. An image reading apparatus according to claim 1, wherein each grating pitch of said diffraction grating is set so that projections of the grating pitches on a plane tangent to a center point of said diffraction grating are substantially the same.

7. An image reading apparatus according to claim 1, wherein a sensor surface of said multi-line sensor is concavely curved toward said diffraction grating.

8. An image reading apparatus according to claim 7, wherein an amount of curvature of said sensor surface is set so that a relation of $r_1=(½)·R_1$ is satisfied where $r_1$ is a radius of curvature of said sensor surface and $R_1$ is a radius of curvature of said diffraction grating.

9. An image reading apparatus according to claim 1, further comprising a slit member disposed in the vicinity of a focal plane position of a light beam from the object focused by said image-forming optical element.

10. An image reading apparatus comprising:

light receiving means for digitally reading color light components;

optical image forming means for forming an image of an object on said light receiving means; and color separating means for separating an incident light into color light components and reflection-diffracting said color light components in a direction of said light receiving means, said color separating means including a reflection type blazed diffraction grating which is concavely curved in a sub-scan cross section.

11. An image reading apparatus according to claim 10, wherein said light receiving means comprises a common substrate and a plurality of sensor arrays.

12. An image reading apparatus according to claim 11, wherein said common substrate is curved concavely.

13. An image reading apparatus according to claim 11, wherein said sensor arrays are positioned on a circle so that an equation of $r_1=(½)·R_1$ is satisfied where $r_1$ is a radius of curvature of said sensor surface and $R_1$ is a radius of curvature of said diffraction grating.

14. An image reading apparatus according to claim 10, wherein said light receiving means is disposed on a plane tangent to a circle defined such that an equation of $r_1=(½)·R_1$ is satisfied where $r_1$ is a radius of curvature of said light receiving means and $R_1$ is a radius of curvature of said diffraction grating.

15. An image reading apparatus according to claim 10, further comprising a slit member disposed at about a focal plane position of a light beam from the object focused by said optical image forming means.

16. An image reading apparatus comprising:

light receiving means for digitally reading color light components;

optical image forming means for forming an image of an object on said light receiving means; and color separating means for separating incident light from said object into separate color light components along a dimension of said light receiving means, said color separating means including a reflection type blazed diffraction grating which is concavely curved in a sub-scan cross section.

17. An image reading apparatus according to claim 16, wherein said light receiving means comprises a common substrate and a plurality of sensor arrays.

18. An image reading apparatus according to claim 17, wherein said common substrate is concavely curved in the sub-scan cross section.

19. An image reading apparatus according to claim 17, wherein said sensor arrays are positioned on a circle so as to satisfy an equation, $r_1=(½)R_1$, where $r_1$ is a radius of curvature of said sensor surface and $R_1$ is a radius of curvature of said diffraction grating.

20. An image reading apparatus according to claim 16, wherein said light receiving means is disposed on a plane tangent to a circle defined so as to satisfy an equation, $r_1=(½)R_1$, where $r_1$ is a radius of curvature of said light receiving means and $R_1$ is a radius of curvature of said diffraction grating.

21. An image reading apparatus according to claim 16, further comprising a slit member disposed proximate a focal plane position of a light beam from the object focused by said optical image forming means.

22. An image reading apparatus according to claim 16, further comprising an image-forming optical element having different refracting powers in a main-scan cross section and in the sub-scan cross section, said image-forming optical element being disposed in an optical path between the object and said diffraction grating.

23. An image reading apparatus according to claim 22, wherein said image-forming optical element is disposed in an optical path between said optical image forming means and said diffraction grating.

24. An image reading apparatus according to claim 22, wherein said image-forming optical element has refracting power solely in the sub-scan cross section.

25. An image reading apparatus comprising:

a multi-line sensor, said multi-line sensor comprising a common substrate and a plurality of sensor arrays arranged on said common substrate;

an image-forming optical system for forming an image of an object on said multi-line sensor; and a reflection type blazed diffraction grating for separating a light beam from the object into a plurality of color light components, said diffraction grating being disposed in an optical path between said image-forming optical system and said multi-line sensor, wherein said diffraction grating is concavely curved with respect to said multi-line sensor in a sub-scan cross section.

26. An image reading apparatus according to claim 25, further comprising an image-forming optical element having different refracting powers in a main-scan cross section than in the sub-scan cross section, said image-forming optical element being disposed in an optical path between the object and said diffraction grating.

27. An image reading apparatus according to claim 26, wherein said image-forming optical element is disposed in an optical path between said image-forming optical system and said diffraction grating.

28. An image reading apparatus according to claim 26 or 27, wherein said image-forming optical element has refracting power solely in the sub-scan cross section.

29. An image reading apparatus according to claim 26 or 27, wherein said diffraction grating is curved in the sub-scan cross section with a curvature of part of a circle.

30. An image reading apparatus according to claim 26 or 27, wherein each grating pitch of said diffraction grating is set so that projections of the grating pitches on a plane tangent to a center point of said diffraction grating are substantially the same.

31. An image reading apparatus according to claim 26 or 27, wherein a sensor surface of said multi-line sensor is concavely curved with respect to said diffraction grating.

32. An image reading apparatus according to claim 31, wherein an amount of curvature of said sensor surface is set so that a relation of r1=(½)·R1 is satisfied where r1 is a radius of curvature of said sensor surface and R1 is a radius of curvature of said diffraction grating.

33. An image reading apparatus according to claim 26 or 27, further comprising a slit member disposed in the vicinity of a focal plane position of a light beam from the object focused by said image-forming optical element.

* * * * *